United States Patent Office
3,755,398
Patented Aug. 28, 1973

3,755,398
SILOXAZANES COMPOSITIONS AND
PROCESSES THEREOF
Richard Paul Bush, Penarth, Glamorgan, Wales, assignor
to Midland Silicones Limited, Berkshire, England
No Drawing. Original application Mar. 24, 1969, Ser.
No. 809,950, now Patent No. 3,641,089. Divided and
this application Aug. 2, 1971, Ser. No. 168,345
Int. Cl. C07f 7/02
U.S. Cl. 260—448.2 N          5 Claims

ABSTRACT OF THE DISCLOSURE

This disclosure relates to various cyclic siloxazane compounds and to processes thereof. These cyclic siloxazane compounds are prepared by reacting certain lithium-containing siloxazanes with organosilicon materials containing at least one silicon bonded halogen atom per molecule.

RELATED APPLICATION

This application is a divisional of U.S. application Ser. No. 809,950 filed Mar. 24, 1969, now U.S. Pat. No. 3,641,089, said application being based on and claiming convention priority under 35 U.S.C. 119 on U.K. application No. 15,282/68 filed Mar. 29, 1968.

This application relates to compounds containing cyclic siloxazane structures and also relates to processes for the preparation of such compounds.

It has been known for some time that hydrocarbon lithium compounds, for example, butyl lithium, will react with cyclic organosiloxanes to effect the polymerization thereof by siloxane bond cleavage and re-arrangement. According to this invention, we have unexpectedly found that when certain cyclic structures containing both silazane and siloxane linkages, namely cyclic siloxazanes, are reacted with hydrocarbon lithium compounds, the products obtained are not polymerized structures but are new and useful cyclic materials having one or two lithium atoms attached to nitrogen atoms in the cyclic structure.

This invention therefore provides, according to one of its aspects, cyclic siloxazane compounds having therein one or two groups of the formula

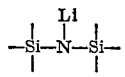

wherein one of the free valency bonds of each silicon atom is attached to another member of the cyclic structure and the remaining free valency bonds are attached to radicals selected from alkyl and alkenyl radicals containing less than 5 carbon atoms and phenyl radicals.

The invention also includes a process for the preparation of a cyclic siloxazane having a lithium atom attached to at least one nitrogen atom in the cyclic structure which comprises contacting in the presence of an organic solvent (A) a cyclic siloxazane compound containing one or two groups of the formula

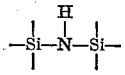

wherein one of the free valency bonds of each silicon atom is attached to another member of the cyclic structure and the remaining free valency bonds are attached to radicals selected from alkyl and alkenyl radicals containing less than 5 carbon atoms, and phenyl radicals with (B) a lithium alkyl compound, a lithium alkenyl compound or a lithium aryl compound.

As the siloxazane reactants for use in preparing the lithium-containing siloxazanes of this invention, there can be employed any cyclic siloxazane containing at least one or two silazanes, that is

groups and wherein the organic radicals attached to the silicon atoms are selected from alkyl and alkenyl radicals containing less than 5 carbon atoms and phenyl radicals. Suitable cyclic starting materials therefore include

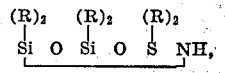

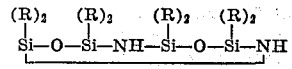

and

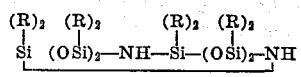

wherein the R radicals represent the specified alkyl, alkenyl or phenyl radicals. Preferably, the organic radicals attached to the silicon atoms are alkyl radicals containing less than 5 carbon atoms or phenyl radicals, and most preferably are methyl radicals.

The novel compounds of this invention include cyclic siloxazanes in which there are present one or two lithium atoms bonded to nitrogen atoms. Examples of such compounds are:

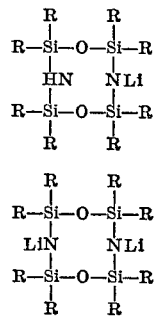

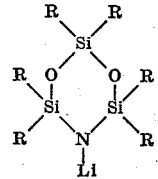

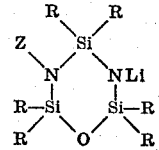

wherein Z is a hydrogen atom, an alkyl radical, for example, methyl, propyl, butyl or octadecyl, an aryl radical, for example, phenyl or naphthyl, a silyl group, for example, a trimethylsilyl or phenyldimethylsilyl, a siloxy group or a polysiloxane residue and R is as hereinabove defined.

Preparation of the lithium-containing cyclic siloxazanes of this invention involves reacting the appropriate cyclic siloxazane with an alkyl-, alkenyl- or aryl-lithium compound, for example butyl lithium, vinyl lithium or phenyl lithium, the preferred compound being butyl-lithium. The reaction is performed in the presence of an organic solvent and we have found that certain of the desired lithium-containing cyclic siloxazanes, in particular, those containing two Si-N-Si groupings, can convert spontaneously to a ring contracted form. This conversion is accelerated in the presence of a polar solvent and for this reason we prefer to employ non-polar solvents such as toluene, xylene, benzene and n-hexane or n-pentane during the preparation of the lithium-substituted siloxazanes of the present invention. Although preferred, the use of non-polar solvents in the reaction is not essential. The formation of the ring contracted products is retarded at the lower temperatures and we have found that good yields of the desired product can be obtained at such temperatures even in the presence of a polar solvent. In fact, as hereinafter described, the subsequent reaction of lithium-substituted siloxazanes with organosilicon materials containing silicon-bonded halogen atoms is expedited by the presence of a polar solvent and such a solvent can advantageously be incorporated with the siloxazane prior to reaction with the hydrocarbon lithium compound when the reaction is to be performed at relatively low temperatures.

The major utility of the products of this invention lies in their use as intermediates. In general, therefore, separation of the lithium-containing cyclic siloxazanes or their storage is not called for since they would normally be employed in the form of their solvent solutions the preparation of which can take place either in situ or very shortly prior to the desired reaction in which they are to be employed.

The relative proportions of the siloxazane and lithium-containing starting materials is not narrowly critical and will depend mainly upon the type of reaction product desired. Preferably, stoichiometric or approximately stoichiometric amounts are employed.

The reaction between (A) and (B) can be performed at any temperature ranging from the freezing point to the reflux temperature of the reaction mixture. In general, however, temperatures at the lower end of the range, preferably from —50° C. to 20° C. are preferred as the use of a low temperature tends to discourage the conversion of the desired product to the ring-contracted form.

As hereinbefore stated, the novel lithium-substituted cyclic siloxazanes of this invention are primarily of use as intermediates in the preparation of various types of organosilicon compounds. In particular, they have been found to be reactive with organosilicon materials containing silicon-bonded halogen atoms, particularly the chlorosilanes. For example, the lithium-substituted siloxazanes can be reacted with organosiloxanes containing silicon-bonded chlorine atoms or with mono-, di-, tri- or tetra-chlorosilanes with the elimination of a lithium halide to provide simple compounds or polymers containing cyclic siloxazane residues in the polymeric structure. This invention therefore further includes a process for the preparation of compounds containing one or more cyclic siloxazane structures which comprises reacting the lithium-containing cyclic siloxazanes of the invention with an organosilicon material containing at least one silicon-bonded halogen atom.

The nature of the organic groups present in the halogenated organosilicon reactant is not critical provided they are substantially inert to the cyclic siloxazanes under the reaction conditions. Thus, the organic groups can be, for example alkyl radicals, cycloalkyl radicals, alkenyl radicals, aryl radicals, halogenated hydrocarbon radicals, for example, chloromethyl, bromophenyl and trifluoropropyl, alkoxy radicals and substituted amino radicals, e.g., dimethylamino and octylamino. Also, if desired, a proportion of the non-halogen substituents can be hydrogen atoms. As the halogen-substituted organosilicon materials, there are preferably employed silanes of the general formula $R'_nSiX_{4-n}$, wherein $R'$ is a monovalent hydrocarbon radical for example an alkyl, cycloalkyl, alkaryl, aralkyl or aryl radical, or a substituted amino radical, X is chlorine, bromine or fluorine and $n$ has a value from 1 to 3. Preferably, the $R'$ radicals are selected from lower alkyl such as methyl, ethyl and butyl radicals, lower alkenyl radicals, such as vinyl and allyl radicals, phenyl radicals and alkyl and dialkyl-amino radicals.

The structure of the product obtained from the reaction of the cyclic siloxazane and the halogenated organo-silicon compound will depend upon the particular reactants employed. When the cyclic siloxazane contains two lithium atoms, it can react with a siloxane containing two or more silicon-bonded halogen groups, to give a linear or 3-dimensional polymer such as one containing repeating units of the formula

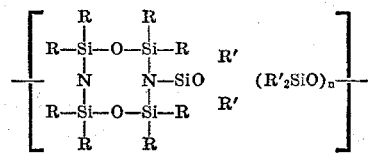

Alternatively, the reaction conditions can be chosen such that a single chlorine atom is reacted leaving one or more silicon-bonded chlorine atoms in the product for subsequent reaction as by hydrolysis.

Cyclic siloxazanes containing only one lithium atom attached to a nitrogen atom will similarly react with a halosilane to provide a compound containing a silicon atom attached to the appropriate nitrogen atom. We have found, however, that the particular type of cyclic siloxazane exemplified by the general formula gives rise to a mixture of two products, one having a silicon atom attached to each of the two nitrogen atoms and the other product being the initial cyclic siloxazane employed to prepare the lithium derivative. Of particular interest are the products obtained by reacting the siloxazane containing two nitrogen-attached lithium atoms with a triorgano-monohalosilane in which one of the organic radicals is an olefinically unsaturated hydrocarbon radical, preferably a vinyl radical, or a dialkylamino radical. Such products can contain two or more silicon-bonded unsaturated or amino radicals which can be reacted with compounds containing —SiH, SiOH or —COH groups according to known techniques to provide a variety of polymeric materials containing the cyclic siloxazane residue in the main polymer chain. Most preferred as the organosilicon materials containing silicon-bonded halogen atoms therefore are those of the general formula $ZR''_2SiCl$, wherein Z represents the vinyl radical or the dialkylamino radical and each $R''$ represents a monovalent hydrocarbon radical free of aliphatic unsaturation. Examples of the products derived from compounds represented by the general formula $ZR''_2SiCl$ are

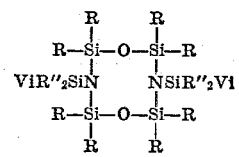

and

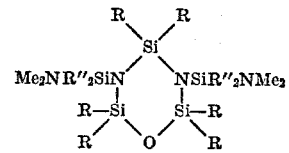

Because of the tendency for the lithium-substituted siloxazane to convert spontaneously to another type of compound the reaction between the halosilane and siloxazane is best performed by adding the halosilane immediately following the formation of the lithium-containing reactant. The temperature at which the addition is performed is not narrowly critical but preferably falls within the range from —50° C. to 20° C. The reaction is expedited by the presence of a polar solvent, for example, tetrahydrofuran, dimethoxy ethane, or hexamethylphosphoro-triamide and preferably a solvent of this type is incorporated into the reaction mixture either alone or in addition to any non-polar solvents which may be present.

In addition to their utility as intermediates and lithium-containing silazanes and siloxazanes of this invention find use as polymerization catalysts for siloxanes.

The following examples illustrate the invention and are not intended to limit the invention in any way.

Example 1

Butyl lithium (2.69 g., 1 mol as a 22% by weight solution in n-hexane) was added with stirring to 2,2,4,4,6,6-hexamethyl - 1 - aza - 3,5 - dioxa-2,4,6-trisilacyclohexane (9.3 g., 1 mol) in pentane (25 ml.) at −20° C. under argon. This solution as prepared contained the lithium derivative of the cyclic siloxane, namely 1-lithio-2,2,4,4,6,6-hexamethyl-1-aza-3,5-dioxa-2,4,6-trisilacylohexane.

After one hour tetrahydrofuran (100 ml.) and chlorotrimethylsilane (4.6 g.) were added to the solution at room temperature and the mixture refluxed for 16 hours. Filtration of the resulting reaction mixture followed by distillation under reduced pressure yielded 1-trimethylsilyl-2,2,4,4,6,6-hexamethyl - 1 - aza - 3,5 - dioxa-2,4,6-trisilacyclohexane (3.5 g., 28%), B.P. 83°/6 mm.

The compound was identified by elemental analysis (Found (percent): C, 38.0; H, 9.4; N, 4.6; Si, 36.8. $C_9H_{27}NO_2Si_4$ requires (percent): C, 36.9; H, 9.2; N, 4.8; and Si, 38.2); and by its infrared and nuclear magnetic resonance spectra.

Example 2

Butyl-lithium (3.02 g., 2 mol. as a 22% soln. in hexane) was added to 2,2,4,4,6,6,8,8,10,10,12,12-dodecamethyl-1,7 - diaza - 3,5,9,11 - tetraoxa - 2,4,6,8,10,12-hexasilacyclododecane (10.5 g., 1 mol) in 1,2-dimethoxyethane (100 ml.) at −30° C. This solution as prepared contained the compound 1,7 - dilithio - 2,2,4,4,6,6,8,8,10,10,12,12-dodecamethyl - 1,7 - diaza-3,5,9,11-tetraoxa-2,4,6,8,10,12-hexasilacyclododecane.

After 2 hrs. at room temperature, chlorotrimethylsilane (5.2 g., 2 mol.) was added to the solution which was then allowed to stand for 18 hrs. at room temperature. Filtration and distillation of the solution after this time gave 1,7 - bis(trimethylsilyl) - 2,2,4,4,6,6,8,8,10,10,12,12-dodecamethyl - 1,7 - diaza - 3,5,9,11 - tetraoxa-2,4,6,8,10,12-hexasilacyclododecane (11.5 g., 83%), B.P. 106°/0.5 mm., M.P. 57–8°. The sample was identified by its infrared and nuclear magnetic resonance spectra and by its degradation by hydrogen chloride to ammonium chloride, chlorotrimethylsilane and 1,5 - dichloro-1,1,3,3,5,5-hexamethyltrisiloxane.

Example 3

In the manner described in Example 2 there were reacted together butyl-lithium (1.16 g., 1 mol), 2,2,4,4,6,6,8,8,10,10,12,12 - dodecamethyl - 1,7 - diaza-3,5,9,11-tetraoxa - 2,4,6,8,10,12 - hexasilacyclododecane (8.0 g., 1 mol.) and chlorotrimethylsilane (1.97 g., 1 mol) to give after filtration and distillation 1-trimethylsilyl-2,2,4,4,6,6, 8,8,10,10,12,12-dodecamethyl - 1,7 - diaza - 3,4,9,11-tetraoxa - 2,4,6,8,10,12 - hexasilacyclododecane (4.5 g., 49%), B.P. 94°/0.5 mm., identified by infrared and nuclear magnetic resonance spectroscopy and the products of hydrogen chloride degradation, which were as in Example 2.

Example 4

Butyl lithium (4.9 g., 2.0 mol) was added to 2,2,4,4,6,6,8,8-octamethyl-1,5-diaza - 3,7 - dioxa-2,4,6,8-tetrasilacyclo-octane (11.3 g., 1.0 mol) in 1,2-dimethoxyethane (100 ml.) at −30° C. The mixture was maintained at this temperature for 1.5 hours and dimethylvinylchlorosilane (9.25 g., 2.0 mol) added. Lithium chloride was precipitated and removed by filtration. Distillation of the filtrate yielded 1,5 - bis(dimethylvinylsilyl)-2,2,4,4,6,6,8,8-octamethyl-1,5-diaza-3,7-dioxa - 2,4,6,8 - tetrasilacyclooctane (12.0 g., 68%).

Example 5

Butyl-lithium (9.83 g., 2 mol) as a 22% solution in hexane was added at −20° C. under argon with stirring to a solution of 2,2,4,4,6,6 - hexamethyl-1,3-diaza-5-oxa-2,4,6-trisilacyclohexane (16.9 g., 1 mol) in 1,2-dimethoxyethane (150 ml.). After 20 mins., (dimethylamino) dimethylchlorosilane (21.2 g., 2 mol) was added and the mixture allowed to reach room temperature. Filtration, evaporation of solvent and fractional distillation gave a product resulting from re-arrangement of the ring structure and 1,3-bis(dimethylaminodimethylsilyl)-2,2,4,4,6,6-hexamethyl-1,3-diaza-5-oxa-2,4,6 - trisilacyclohexane (2 g.), B.P. 122°/1 mm. (Found (percent): C, 40.8; H, 9.9; N, 13.2; Si, 34.2. $C_{14}H_{42}N_4OSi_5$ requires (percent): C, 39.8; H, 9.95; N, 13.3; Si, 33.15), which was further characterized spectroscopically.

Example 6

In the manner described in Example 5, the dilithium salt of the starting siloxazane of Example 5 was reacted with $(CH_3)_2SiCl_2$ (2 mol) to give a solution containing 1,3-bis(chlorodimethylsilyl)-2,2,4,4,6,6 - hexamethyl-1,3-diaza-5-oxa-2,4,6-trisilacyclohexane. Treatment of this solution with dimethylamine (2 mol) followed by filtration, evaporation of solvent and distillation gave the product of Example 5 in 57% yield.

That which is claimed is:

1. A process comprising reacting a cyclic siloxazane compound selected from the group consisting of

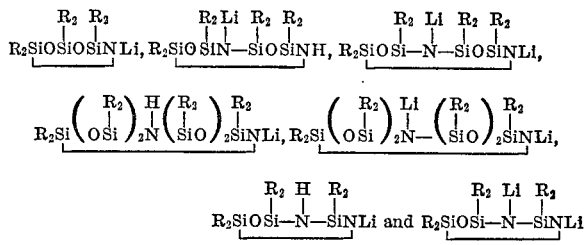

wherein each R is an alkyl or alkenyl radical containing less than 5 carbon atoms or a phenyl radical, with a halogenosilicon compound selected from the group consisting of silanes of the formula $R'_nSiX_{4-n}$ wherein R' is a lower alkyl radical, lower alkenyl radical, phenyl radical, alkyl amino or dialkyl amino radicals wherein the alkyl substituents are lower alkyl radicals, X is a halogen atom, $n$ is 1, 2, or 3.

2. The process of claim 1 wherein $n$ is 3, one R' is $CH_2=CH-$ or $(CH_3)_2N$; the remaining two substituents represented by R' are methyl, ethyl, butyl or phenyl radicals and X is Cl.

3. The process of claim 1 wherein the reaction is carried forward in the presence of a polar solvent.

4. An organosilicon compound of the general formula

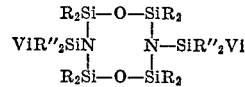

wherein each R and R'' represents an alkyl radical containing less than 5 carbon atoms or a phenyl radical and Vi represents a vinyl radical.

5. An organosilicon compound of the general formula

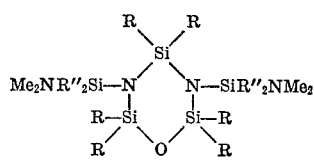

wherein R and R'' represent an alkyl radical containing less than 5 carbon atoms or a phenyl radical and Me represents a methyl radical.

References Cited
UNITED STATES PATENTS 3,239,550  3/1966  Murray  260—448.2 N
3,239,551  3/1966  Murray  260—448.2 N
3,271,361  9/1966  Murray  260—448.2 N
3,479,383  11/1969  Klebe  260—448.2 N
3,592,833  7/1971  Montigny et al.  260—448.2 N WERTEN F. W. BELLAMY, Primary Examiner U.S. Cl. X.R.

260—448.2 E